United States Patent
Seo et al.

(10) Patent No.: US 12,169,298 B2
(45) Date of Patent: Dec. 17, 2024

(54) POLARIZING PLATE AND IMAGE DISPLAY DEVICE COMPRISING THE SAME

(71) Applicant: LG CHEM, LTD., Seoul (KR)

(72) Inventors: Jung Hyun Seo, Daejeon (KR); Kyungki Hong, Daejeon (KR); Yeongrae Chang, Daejeon (KR); Jin Young Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 628 days.

(21) Appl. No.: 16/760,528

(22) PCT Filed: Mar. 6, 2019

(86) PCT No.: PCT/KR2019/002606
§ 371 (c)(1),
(2) Date: Apr. 30, 2020

(87) PCT Pub. No.: WO2019/172651
PCT Pub. Date: Dec. 9, 2019

(65) Prior Publication Data
US 2021/0223453 A1    Jul. 22, 2021

(30) Foreign Application Priority Data

Mar. 6, 2018    (KR) .................... 10-2018-0026390
Mar. 6, 2019    (KR) .................... 10-2019-0025662

(51) Int. Cl.
  *G02B 5/30*    (2006.01)
  *G02B 1/14*    (2015.01)
  *G02F 1/1335*   (2006.01)
  *G02F 1/13363*  (2006.01)

(52) U.S. Cl.
  CPC ............ *G02B 5/3083* (2013.01); *G02B 1/14* (2015.01); *G02B 5/305* (2013.01); *G02F 1/133531* (2021.01); *G02F 1/133638* (2021.01); *C09K 2323/035* (2020.08)

(58) Field of Classification Search
  CPC ........ G02B 1/14; G02B 5/3083; G02B 5/305; G02B 5/3025; G02F 1/133531; G02F 1/133638; C09K 2323/035; B05D 7/02
  See application file for complete search history.

(56) References Cited

U.S. PATENT DOCUMENTS

| | | | |
|---|---|---|---|
| 10,710,291 B2 | 7/2020 | Takenaka et al. | |
| 10,948,764 B2 | 3/2021 | Koike et al. | |
| 2011/0128627 A1 | 6/2011 | Kurahashi | |
| 2012/0229732 A1* | 9/2012 | Koike | G02F 1/13363 359/492.01 |
| 2014/0184994 A1* | 7/2014 | Kuroda | G02F 1/1333 427/163.1 |
| 2014/0211310 A1 | 7/2014 | Kuroda et al. | |
| 2014/0247413 A1 | 9/2014 | Kuroda et al. | |
| 2014/0247414 A1 | 9/2014 | Kuroda et al. | |
| 2015/0022748 A1 | 1/2015 | Takeda et al. | |
| 2015/0140279 A1* | 5/2015 | Kang | C08J 7/042 427/508 |
| 2015/0166818 A1 | 6/2015 | Kang et al. | |
| 2015/0197662 A1 | 7/2015 | Kang et al. | |
| 2015/0299504 A1 | 10/2015 | Kang et al. | |
| 2016/0054481 A1* | 2/2016 | Kim | B05D 3/067 156/247 |
| 2016/0054494 A1 | 2/2016 | Kitagawa et al. | |
| 2016/0146978 A1* | 5/2016 | Lee | G02B 1/14 427/163.1 |
| 2016/0146996 A1 | 5/2016 | Takeda et al. | |
| 2016/0306452 A1 | 10/2016 | Jung et al. | |
| 2016/0327691 A1 | 11/2016 | Shi et al. | |
| 2018/0299710 A1 | 10/2018 | Kuroda et al. | |

FOREIGN PATENT DOCUMENTS

| | | | | |
|---|---|---|---|---|
| CN | 101063721 A | 10/2007 | | |
| CN | 103823270 A | 5/2014 | | |
| EP | 3677935 B1 * | 7/2022 | ............... | B05D 7/02 |
| JP | 2008-107432 A | 5/2008 | | |
| JP | 2011-113061 A | 6/2011 | | |
| JP | 2012-027401 A | 2/2012 | | |
| JP | 2014-157231 A | 8/2014 | | |
| JP | 5757315 B2 * | 7/2015 | ......... | B29C 48/0018 |
| JP | 2018-022060 A | 2/2018 | | |
| JP | 7330469 B2 * | 8/2023 | ............... | B05D 7/02 |
| KR | 10-0956534 B1 | 5/2010 | | |
| KR | 10-2011-0011406 A | 2/2011 | | |
| KR | 10-2013-0135152 A | 12/2013 | | |
| KR | 10-2014-0027026 A | 3/2014 | | |
| KR | 10-2015-0003709 A | 1/2015 | | |
| KR | 10-2015-0099470 A | 8/2015 | | |
| KR | 10-1661049 B1 | 9/2016 | | |
| KR | 10-2017-0086477 A | 7/2017 | | |
| KR | 10-1822701 B1 | 1/2018 | | |
| KR | 102181559 B1 * | 11/2020 | ............... | B05D 7/02 |
| WO | 2011-058774 A1 | 5/2011 | | |
| WO | 2013-179951 A | 12/2013 | | |
| WO | 2017-150646 A1 | 9/2017 | | |

OTHER PUBLICATIONS

International Search Report Issue for International Application No. PCT/KR2019/002606 on Jun. 14, 2019, 4 pages.

* cited by examiner

*Primary Examiner* — Sophie Hon
(74) *Attorney, Agent, or Firm* — ROTHWELL, FIGG, ERNST & MANBECK, P.C.

(57) ABSTRACT

The present invention relates to a polarizing plate including: a polarizer; a first hard coating layer positioned on the polarizer and containing binder resin including (meth) acrylate-based (co) polymer; a light transmitting substrate positioned on the first hard coating layer, having retardation of 3000 nm or more, and having in-plane birefringence; and a second hard coating layer positioned on the light transmitting substrate and including a binder resin, and solid-type inorganic nanoparticles dispersed in the binder resin, wherein the degree of a angle formed by the slow axis of the light transmitting substrate and the absorption axis of the polarizer is 5 to 85°, and an image display device including the same.

13 Claims, No Drawings

POLARIZING PLATE AND IMAGE DISPLAY DEVICE COMPRISING THE SAME

FIELD OF THE INVENTION

Cross-Reference to Related Application(s)

This application is a 35 U.S.C. 371 National Phase Entry Application from PCT/KR2019/002606, filed on Mar. 6, 2019, designating the United States and which claims the benefit of Korean Patent Application No. 10-2018-0026390 filed on Mar. 6, 2018, and Korean Patent Application No. 10-2019-0025662 filed on Mar. 6, 2019, with the Korean Intellectual Property Office, the disclosures of which are incorporated herein by reference in their entirety.

The present invention relates to a polarizing plate constituting an image display device, and an image display device including the same.

BACKGROUND OF THE INVENTION

Recently, with the development of mobile devices such as smart phones, table PCs, and the like, a substrate for a display has been required to be thin and slim. As the material of a window or a front panel of a display of such a mobile device, glass or tempered glass having excellent mechanical properties such as tensile strength and excellent impact absorption to external impact has been generally used. However, glass has high reflectance, thus deteriorating visibility of a display, increases the weight of a mobile device due to the weight of the glass itself, and may be damaged by external impact.

Thus, plastic resins are being studied as materials capable of replacing glass. A plastic resin film is light and is less susceptible to being broken, and thus is suitable for the trend toward lighter mobile devices. Particularly, in order to achieve a film having high hardness and abrasion resistance, a film including a hard coating layer coated on a supporting substrate has been suggested.

As the supporting substrate coated with a hard coating layer, a polarizer protection film for protecting a polarizer positioned on the image display side of a display is used. The polarizer protection film generally consists of a light transmitting substrate film, and as the light transmitting substrate film, a cellulose ester-based film represented by triacetyl cellulose (TAC) is most widely used. Such a cellulose ester-based film has advantages in that it has excellent transparency and optical isotropy, it hardly exhibits an in-plane phase difference, and thus does not generate an interference pattern, and it has little adverse influence on the display quality of a display device.

However, the cellulose ester-based film is unfavorable in terms of cost, and has disadvantages in terms of high moisture permeability and inferior water resistance. Due to such high moisture permeability and inferior water resistance, a significant amount of moisture permeation may be continuously generated during use, thus generating lifting from a polarizer, thereby causing light leakage.

Due to the disadvantages of the cellulose ester-based film, an attempt to apply a polyester-based film such as a polyethylene terephthalate (PET)-based film as the substrate film of a polarizer protection film has recently been made. Such a polyester-based film has advantages in that it has a low cost and excellent water resistance, and hardly induces light leakage, and it has excellent mechanical properties.

However, such a polyester-based film has disadvantages in that it includes an aromatic ring having a high refractive index in the structure, and generates a refractive index difference (in-plane birefringence) and an in-plane phase difference due to a difference between draw ratios of MD/TD directions and the like, in the process of manufacturing the film. As a result, when the polyester-based film is applied as the substrate film of a polarizer protection film, a rainbow phenomenon may be generated by light transmission/reflection, thus deteriorating the visibility of an image display device.

BRIEF SUMMARY OF THE INVENTION

The present invention provides a polarizing plate that can effectively inhibit the generation of a rainbow phenomenon derived from a polyester-based substrate film, has excellent visibility and mechanical properties, and thus can be appropriately applied for a window or a front panel of an image display device, and an image display device including the same.

According to one embodiment of the present invention, a polarizing plate is provided, which includes: a polarizer;
a first hard coating layer positioned on the polarizer and containing a binder resin including a (meth) acrylate-based (co) polymer;
a light transmitting substrate positioned on the first hard coating layer, having retardation of 3000 nm or more, and having in-plane birefringence; a second hard coating layer positioned on the light transmitting substrate and including a binder resin; and solid inorganic nanoparticles dispersed in the binder resin, wherein an acute angle formed by a slow axis of the light transmitting substrate and an absorption axis of the polarizer is 5 to 85°.

According to another embodiment of the present invention, an image display device including the polarizing plate is provided.

Hereinafter, a polarizing plate and an image display device according to specific embodiments of the invention will be explained in detail.

Throughout the specification, the terms 'first', 'second', and the like are used to explain various constructional elements, and are used only to distinguish one constructional element from other constructional elements.

Further, a (meth) acryl includes both an acryl and a methacryl.

In addition, hollow inorganic nanoparticles mean particles wherein an empty space exists on the surface and/or inside of the inorganic nanoparticles.

Also, a (co) polymer includes both a copolymer and a homopolymer.

The present inventors confirmed through experiments that by using a light transmitting substrate having in-plane birefringence as a supporting substrate and controlling the arrangement direction of the light transmitting substrate to a polarizer so that an acute angle formed by the slow axis that is a direction having the highest refractive index in the light transmitting substrate having in-plane birefringence, and the absorption axis of the polarizer, may become 5 to 85°, 10 to 80°, 20 to 80°, 20 to 70°, 30 to 70°, 35 to 65°, or 35 to 50°, the rainbow phenomenon of a polarizing plate may be suppressed, luminance may be increased to improve visibility, and mechanical properties such as strength and the like may be improved, and completed the present invention.

In addition, it was confirmed that by controlling the retardation of the light transmitting substrate having in-plane birefringence to 3000 nm or more, 4000 to 10,000 nm, or 5000 to 8000 nm, the rainbow phenomenon due to destructive interference may be inhibited, and the visibility of an image display device may be improved equivalently to a cellulose ester-based film.

If either of the angle formed by the slow axis of the light transmitting substrate and the absorption axis of the polarizer, and the retardation of the light transmitting substrate, is not controlled within an appropriate range, mechanical properties may be deteriorated, the rainbow phenomenon may be generated due to the birefringence of the light transmitting substrate, and the visibility of an image display device may be deteriorated.

It was also confirmed that by bonding a laminate of first and second hard coating layers formed on respective sides of the light transmitting substrate on one side of the polarizer, the polarizer that is vulnerable to the external environment may be protected, and simultaneously, the mechanical properties of the whole polarizing plate may be improved. Thus, a polarizing plate including a polarizer and a laminate formed on the polarizer, due to excellent visibility and mechanical properties, may be appropriately applied as a window or a front panel of an image display device.

DETAILED DESCRIPTION OF THE INVENTION

Hereinafter, a polarizing plate of one embodiment will be explained in detail according to each element.

The polarizing plate of one embodiment includes a polarizer. As the polarizer, those commonly used in the art, for example, a film consisting of polyvinyl alcohol (PVA) including iodine or a dichroic dye, may be used. Herein, the polarizer may be prepared by uptaking iodine or a dichroic dye into a polyvinyl alcohol film and drawing it, but the preparation method is not specifically limited.

Meanwhile, when the polarizer is a polyvinyl alcohol film, the polyvinyl alcohol film is not specifically limited as long as it includes a polyvinyl alcohol resin or derivatives thereof. Herein, as the derivatives of the polyvinyl alcohol resin, although not limited hereto, a polyvinyl formal resin, a polyvinyl acetal resin, and the like may be mentioned. As the polyvinyl alcohol film, commercially available polyvinyl alcohol films commonly used for the preparation of a polarizer, for example, P30, PE30, PE60 (manufactured by Kuraray Co., Ltd.), M3000, M6000 (manufactured by Nippon Synthetic Chemical Industry Co., Ltd.), and the like may be used.

The polyvinyl alcohol film, although not limited thereto, has a polymerization degree of 1000 to 10,000 or 1500 to 5000. When the polymerization degree fulfills the above range, molecular movement is free, and mixing with iodine or a dichroic dye and the like may be flexibly achieved. The thickness of the polarizer may be 30 μm or less, 20 μm or less, 1 to 20 μm, or 1 μm to 10 μm. In this case, devices such as a polarizing plate or an image display device including the polarizer can be made thin and light.

In the polarizing plate according to the above embodiment, a laminate in which a first hard coating layer, a light transmitting substrate having in-plane birefringence, and a second hard coating layer are sequentially stacked, may be bonded on one side of the polarizer. Herein, as the light transmitting substrate, a polyethylene terephthalate (PET) film that has excellent water resistance and thus may hardly induce light leakage, and has excellent mechanical properties, may be used. Further, since the first and second hard coating layers are formed on respective sides of the light transmitting substrate, the polarizing plate may have mechanical properties equivalent to glass materials, and thus the polarizing plate including the laminate may be appropriately applied for a window or a front panel of an image display device.

Meanwhile, a quarter wave plate may be bonded on the other (opposite) side of the polarizer so as to face the first hard coating layer. The quarter wave plate is a wave plate that changes the direction of light polarization by 45°, and may perform a function of changing incident polarized light with linear polarization into circularly polarized light. For example, when the angle between linear polarization and the light axis is 45°, emitted polarized light may become right-handed circular polarized light.

By positioning the quarter wave plate and laminate on respective sides of the polarizer, and controlling the angle formed by the absorption axis of the polarizer and the slow axis of the light transmitting substrate to 5 to 85°, the rainbow phenomenon of the polarizing plate according to one embodiment of the present invention may be inhibited, and luminance may be increased, thereby improving the visibility.

The bonding of the laminate including the first hard coating layer on one side of the polarizer and the bonding of the quarter wave plate on the other side may be conducted, for example, by coating an adhesive on the surface of the polarizer, the first hard coating layer, or the quarter wave plate using a roll coater, a gravure coater, a bar coater, a knife coater, a capillary coater, and the like, and then thermally laminating them with a lamination roll, laminating them by room temperature compression, or laminating them and then irradiating UV. Meanwhile, as the adhesive, various adhesives for a polarizing plate used in the art, for example, a polyvinyl alcohol-based adhesive, a polyurethane-based adhesive, an acryl-based adhesive, a cationic-based, a radical-based adhesive, and the like may be used without limitation.

The polarizing plate of one embodiment includes a first hard coating layer positioned between the polarizer and the light transmitting substrate having in-plane birefringence.

The first hard coating layer may include a binder resin including a (meth) acrylate-based (co) polymer.

Further, the (meth) acrylate-based (co) polymer included in the binder resin may include monofunctional or multifunctional (meth) acrylate-based repeat units and urethane (meth) acrylate-based repeat units, thus affording high hardness, flexibility, and impact resistance to the first hard coating layer.

The monofunctional or multifunctional (meth) acrylate-based repeat units are derived from monofunctional or multifunctional (meth) acrylate-based compounds, and the urethane (meth) acrylate-based repeat units are derived from urethane (meth) acrylate-based compounds. Thus, the (meth) acrylate-based (co) polymer may be formed by crosslinking polymerization of the monofunctional or multifunctional (meth) acrylate-based compound and the urethane (meth) acrylate-based compound.

The monofunctional or multifunctional (meth) acrylate-based compound is a compound including one or more (meth) acrylate structures capable of progressing a crosslinking reaction by UV rays, infrared rays, a B-beam, or heat to cure a film, and for example, may be tetrahydrofurfuryl acrylate, hydroxy ethyl acrylate, hydroxy propyl acrylate, hydroxy butyl acrylate, trimethylol propane triacrylate (TMPTA), trimethylol propane ethoxy triacrylate (TMPEOTA), glycerine propoxylate triacrylate (GPTA), pentaerythritol triacrylate (PETA), dipentaerythritol hexaacrylate (DPHA), and the like.

Meanwhile, the urethane (meth) acrylate-based compound is a compound in which a (meth) acrylate-based compound is bonded via a urethane bond, and it may be in the form of monomers or oligomers. The urethane (meth) acrylate-based monomer or oligomer may have an average molecular weight of 500 to 200,000, 700 to 150,000, 1000 to 120,000, or 2000 to 100,000.

The polarizing plate according to the above embodiment includes a light transmitting substrate having in-plane birefringence, positioned on the first hard coating layer. As explained above, since the light transmitting substrate has retardation of 3000 nm or more, 4000 to 10,000 nm, or 5000 to 8,000 nm, and is arranged on the first hard coating layer such that the degree of the acute angle formed by the slow axis of the light transmitting substrate and the absorption axis of the polarizer may become 5 to 85°, excellent visibility and excellent mechanical properties may be exhibited without generating the rainbow phenomenon.

The retardation may be calculated by substituting the refractive index ($n_x$) of a slow axis direction that is a direction having the highest refractive index in the plane of a light transmitting substrate, the refractive index ($n_y$) of a fast axis direction that is orthogonal to the slow axis direction, and the thickness d (unit: nm) of the light transmitting substrate, in the following Mathematical Formula 1.

$$Re=(n_x-n_y)\times d \qquad \text{[Mathematical Formula 1]}$$

Further, the retardation may be a value measured using an automatic birefringence analyzer (KOBRA-WR, measurement angle: 0°, measurement wavelength: 548.2 nm), for example. Alternatively, the retardation may be calculated by the following method. First, two sheets of polarizing plates are positioned in the alignment axis direction of the light transmitting substrate, and the refractive indexes ($n_x$, $n_y$) of two axes orthogonal to the alignment axis direction are obtained with an Abbe refractometer (NAR-4T). Herein, the axis exhibiting a higher refractive index is defined as a slow axis. The thickness of the light transmitting substrate is measured, for example, using an electronic micrometer, a difference ($n_x-n_y$) in the refractive indexes (hereinafter, $n_x-n_y$ is referred to as $\Delta n$) is calculated using the refractive indexes obtained above, and retardation may be calculated by the multiplication of the refractive index difference $\Delta n$ and the thickness d (nm) of the light transmitting substrate.

Since the retardation of the light transmitting substrate is 3000 nm or more, a refractive index difference ($\Delta n$), that is, a difference ($\Delta n=n_x-n_y$) between the refractive index ($n_x$) of a slow axis direction and the refractive index ($n_y$) of a fast axis direction that is orthogonal to the slow axis direction, may be 0.05 or more, 0.05 to 0.20, or 0.08 to 0.13. If the refractive index difference ($\Delta n$) is less than 0.05, the thickness of the light transmitting substrate required to obtain the above-explained retardation value may become thick. Meanwhile, if the refractive index difference $\Delta n$ is greater than 0.20, it is required to excessively increase a draw ratio, and thus, the light transmitting substrate may be torn and broken, thereby remarkably deteriorating practicability as an industrial material, and deteriorating hygrothermal resistance.

The refractive index ($n_x$) in the slow axis direction of the light transmitting substrate may be 1.60 to 1.80, or 1.65 to 1.75. Meanwhile, the refractive index ($n_y$) in the fast axis direction of the light transmitting substrate having in-plane birefringence may be 1.50 to 1.70, or 1.55 to 1.65.

Although the thickness of the light transmitting substrate having in-plane birefringence is not limited, it may be 10 to 500 µm, 30 to 400 µm, or 50 to 350 µm. If the thickness of the light transmitting substrate is less than 10 µm, it may be much thinner than a hard coating layer, thus generating curl, and it may be difficult to control the process due to lowered flexibility of the light transmitting substrate, while if it is greater than 500 µm, transmittance of the light transmitting substrate may decrease to deteriorate the optical properties, and thinning of an image display device including the same may be difficult.

Meanwhile, as the light transmitting substrate, a polyethylene terephthalate (PET) film that has excellent water resistance, and thus may hardly induce light leakage, and has excellent mechanical properties, may be used.

The polarizing plate of the above embodiment includes a second hard coating layer positioned on the light transmitting substrate having in-plane birefringence. The second hard coating layer includes binder resin, and solid inorganic nanoparticles dispersed in the binder resin, thus affording high hardness, flexibility, and impact resistance to the second hard coating layer.

The binder resin of the second hard coating layer may include a photocurable resin and a (co) polymer having a weight average molecular weight of 10,000 g/mol or more (hereinafter referred to as a high molecular weight (co) polymer).

The photocurable resin is a polymer of photocurable compounds capable of inducing a polymerization reaction if irradiated by light such as UV, and for example, one or more selected from a group of reactive acrylate oligomers consisting of a urethane acrylate oligomer, an epoxide acrylate oligomer, a polyester acrylate, and a polyether acrylate; and a group of multifunctional acrylate monomers consisting of dipentaerythritol hexaacrylate, dipentaerythritol pentaacrylate, pentaerythritol tetraacrylate, pentaerythritol triacrylate, trimethylol propane triacrylate, glycerine propoxylate triacrylate, trimethylpropane ethoxylate triacrylate, trimethyl propyl triacrylate, 1,6-hexanediol diacrylate, tripropylene glycol diacrylate, and ethylene glycol diacrylate may be used.

The high molecular weight (co) polymer may include, for example, one or more polymers selected from the group consisting of a cellulose-based polymer, an acryl-based polymer, a styrene-based polymer, an epoxide-based polymer, a nylon-based polymer, a urethane-based polymer, and a polyolefin-based polymer.

The solid inorganic nanoparticles dispersed in the binder resin of the second hard coating layer are particles having a maximum diameter of less than 100 nm, inside of which an empty space does not exist. The solid inorganic nanoparticles may have a diameter of 0.5 to 100 nm, or 1 to 30 nm. Further, the solid inorganic nanoparticles may have a density of 2.00 g/cm' to 5.00 g/cm'.

The solid inorganic nanoparticles may contain one or more reactive functional groups selected from the group consisting of a (meth) acrylate group, an epoxide group, a vinyl group, and a thiol group, on the surface. Since the solid inorganic nanoparticles contain the above-explained reactive functional groups, they may have a higher crosslinking degree, thus affording high hardness, flexibility, and impact resistance to the second hard coating layer.

The thickness ratio of the first hard coating layer and the second hard coating layer may be 1:0.5 to 1:1.5, 1:0.6 to 1.4, or 1:0.8 to 1.3. If the thickness ratio of the first hard coating layer and the second hard coating is less than 1:0.5 or greater than 1:1.5, curl of the film may be generated, and thus it may be difficult to maintain a flat film shape, and the film cannot be utilized as an optical film.

The thickness ratio of the light transmitting substrate and the second hard coating layer may be 1:0.1 to 1:1, 1:0.2 to 0.9, or 1:0.3 to 0.8. If the thickness ratio of the light transmitting substrate and the second hard coating layer is less than 1:0.1, the hardness and scratch resistance of a film may be lowered, and thus a polarizing plate cannot be protected from external impact, and if it is greater than 1:1, the hardness of a film may excessively increase, and thus the film may not be curled but may be broken during the processes of bonding with the polarizer and coating of the first hard coating layer.

The formation of the first hard coating layer and the second hard coating layer on respective sides of the light transmitting substrate may be conducted, for example, by coating the compositions for forming the first and second hard coating layers on respective sides of the light transmitting substrate using a roll coater, a gravure coater, a bar coater, a knife coater, a capillary coater, and the like, evaporating the solvent, and then progressing thermal/photocuring to prepare a laminate including the first and second hard coating layers.

Thereafter, on the polarizer or laminate, an adhesive may be coated using a roll coater, a gravure coater, a bar coater, a knife coater, a capillary coater, and the like, and then they may be heat laminated by a lamination roll, laminated by room temperature compression, or they may be laminated and then irradiated by UV. Meanwhile, as the adhesive, various adhesives for polarizing plates used in the art, for example, a polyvinyl alcohol-based adhesive, a polyurethane-based adhesive, an acryl-based adhesive, a cationic-based or radical-based adhesive, and the like may be used without limitation.

Alternatively, the polarizing plate may be prepared by coating a composition for forming a first hard coating layer on a polarizer and progressing thermal/photocuring to form a first hard coating layer, bonding a quarter wave plate on the other side of the polarizer so as to oppose the first hard coating layer, bonding a light transmitting substrate on the first hard coating layer, and then coating a composition for forming a second hard coating layer on the light transmitting substrate and progressing thermal/photocuring to form a second hard coating layer.

The polarizing plate of the above embodiment may further include a low reflective layer positioned on the second hard coating layer. Such a low reflective layer may include a binder resin, and inorganic nanoparticles dispersed in the binder resin. Herein, the inorganic nanoparticles may be hollow inorganic nanoparticles, solid inorganic nanoparticles, or a mixture thereof.

The binder resin includes a (co) polymer including multifunctional (meth) acrylate-based repeat units, and such repeat units may be derived from, for example, multifunctional (meth) acrylate-based compounds such as trimethylol propane triacrylate (TMPTA), trimethylol propane ethoxy triacrylate (TMPEOTA), glycerine propoxylate triacrylate (GPTA), pentaerythritol tetraacrylate (PETA), dipentaerythritol hexaacrylate (DPHA), and the like.

The low reflective layer may further include a fluorine-containing compound having a photoreactive functional group and/or a silicon-based compound having a photoreactive functional group. The photoreactive functional group included in the fluorine-containing compound or silicon-based compound may include one or more functional groups selected from the group consisting of a (meth) acrylate group, an epoxide group, a vinyl group, and a thiol group.

The fluorine-containing compound including a photoreactive functional group may be one or more selected from the group consisting of: i) aliphatic compounds or alicyclic compounds substituted by one or more photoreactive functional groups, in which at least one carbon is substituted by one or more fluorine atoms; ii) heteroaliphatic compounds or heteroalicyclic compounds substituted by one or more photoreactive functional groups, in which at least one hydrogen is substituted by fluorine and at least one carbon is substituted by silicon; iii) polydialkyl siloxane-based polymers substituted by one or more photoreactive functional groups, in which at least one silicon is substituted by one or more fluorine atoms; and iv) polyether compounds substituted by one or more photoreactive functional groups, in which at least one hydrogen is substituted by fluorine.

The hollow inorganic nanoparticles are particles having a maximum diameter of less than 200 nm, wherein an empty space exists on the surface and/or inside. The hollow inorganic nanoparticles may include one or more selected from the group consisting of solid inorganic fine particles having number average particle diameters of 1 to 200 nm, or 10 to 100 nm. The hollow inorganic nanoparticles may have a density of 1.50 g/cm' to 3.50 g/cm'.

The hollow inorganic nanoparticles may contain one or more reactive functional groups selected from the group consisting of a (meth) acrylate group, an epoxide group, a vinyl group, and a thiol group on the surface. Since the hollow inorganic nanoparticles contain the above-explained reactive functional group on the surface, higher crosslinking density may be exhibited.

The solid inorganic nanoparticles may include one or more selected from the group consisting of solid inorganic fine particles having number average particle diameters of 0.5 to 100 nm.

The low reflective layer may include, based on 100 parts by weight of the (co) polymer, 10 to 400 parts by weight of the inorganic nanoparticles, and 20 to 300 parts by weight of the fluorine-containing compound and/or silicon-based compound including photoreactive functional groups.

Since the polarizing plate includes such a low reflective layer, reflection on the light transmitting substrate positioned on the first hard coating layer may be reduced, and thus the generation of the rainbow phenomenon may be effectively inhibited in the polarizing plate of one embodiment. Further, scattered reflection may be reduced on the display surface of an image display device including the low reflective layer, thereby further improving resolution and visibility.

Such a low reflective layer may have a refractive index of 1.3 to 1.5, 1.35 to 1.45, or 1.38 to 1.43, and a thickness of 1 to 300 nm, 5 to 200 nm, or 50 to 150 nm, so as to effectively inhibit reflection on the light transmitting substrate having in-plane birefringence, or scattered reflection on the display surface of an image display device.

The polarizing plate of the above embodiment may further include an anti-fouling layer positioned on the second hard coating layer. The anti-fouling layer may include a binder resin, solid inorganic nanoparticles dispersed in the binder resin, and a fluorine-based compound.

The binder resin of the anti-fouling layer may include a copolymer containing (meth) acrylate-based repeat units. The (meth) acrylate-based repeat units may be derived from multifunctional (meth) acrylate-based compounds such as trimethylol propane triacrylate (TMPTA), trimethylol propane ethoxy triacrylate (TMPEOTA), glycerine propoxylate triacrylate (GPTA), pentaerythritol triacrylate (PETA), dipentaerythritol hexaacrylate (DPHA), and the like. As the binder resin of the anti-fouling layer, two or more kinds may be used in combination, so as to maintain appropriate dispersibility and crosslinking degree when mixed with solid inorganic nanoparticles.

The solid inorganic nanoparticles may have diameters of 0.5 to 100 nm, or 1 to 30 nm. Further, the solid inorganic nanoparticles may have density of 2.00 g/cm' to 5.00 g/cm'. The solid inorganic nanoparticles may contain one or more reactive functional groups selected from the group consisting of a (meth) acrylate group, an epoxide group, a vinyl group, and a thiol group on the surface. Since the solid inorganic nanoparticles contain the above-explained reactive functional groups on the surface, higher crosslinking density may be exhibited, thereby securing further improved anti-fouling property.

The fluorine-based compound is a compound including at least one fluorine atom, and in the anti-fouling layer, the fluorine-based compound may be included, or a crosslinked (co) polymer of the fluorine-based compounds may be included.

The fluorine-based compound may have a weight average molecular weight of 2000 to 200,000, or 5000 to 100,000 (weight average molecular weight converted in terms of polystyrene, measured by GPC) If the weight average molecular weight of the fluorine-based compound is less than 2000, the fluorine-based compounds may not be uniformly and effectively arranged, thus deteriorating the anti-fouling property of the anti-fouling layer, and if it is greater than 200,000, compatibility with other components may be lowered.

The polarizing plate may further include an adhesive layer formed on the other (opposite) side of the quarter wave plate, so as to face the polarizer. The polarizer may be positioned on one side of the quarter wave plate, and the adhesive layer may be positioned on the other side.

The adhesive layer may enable attachment of the polarizing plate of one embodiment to the image panel of an image display device. The adhesive layer may be formed using various adhesives that are well known in the art, and the kind is not specifically limited. For example, the adhesive layer may be formed using a rubber-based adhesive, an acryl-based adhesive, a silicon-based adhesive, a urethane-based adhesive, a polyvinyl alcohol-based adhesive, a polyvinylpyrrolidone-based adhesive, a polyacrylamide-based adhesive, a cellulose-based adhesive, a vinylalkylether-based adhesive, and the like.

The adhesive layer may also be formed by coating an adhesive on the quarter wave plate, or it may be formed by attaching an adhesive sheet prepared by coating an adhesive on a release sheet and drying it, on the quarter wave plate.

Since a laminate including a light transmitting substrate having in-plane birefringence, and first and second hard coating layers formed on respective sides of the light transmitting substrate, is bonded on one side of the polarizer of the polarizing plate according to one embodiment, there is an advantage in terms of excellent mechanical properties including hardness and the like. Specifically, the polarizing plate may have pencil hardness under a 500 g load of 6H or more, 7H to 9H, or 8H to 9H.

In addition, the structure excluding the polarizer in the polarizing plate, that is, the laminate including the first hard coating layer, the light transmitting substrate, and the second hard coating layer, may have pencil hardness under a 1 kg load of 6H or more, 7H to 9H, or 8H to 9H.

Furthermore, an anti-reflective film including the laminate, and a low reflective layer (or anti-fouling layer) formed on the laminate, may have pencil hardness under a 1 kg load of 6H or more, 7H to 9H, or 8H to 9H.

Meanwhile, since the light transmitting substrate having in-plane birefringence included in the polarizing plate is arranged such that the acute angle formed by the slow axis of the light transmitting substrate and the absorption axis of the polarizer may become 5 to 85°, there is an advantage in that the rainbow phenomenon is inhibited.

In order to quantitatively measure the rainbow phenomenon of the polarizing plate, first, the reflectance of the polarizing plate is measured, and from the measured reflectance, mean reflectance and a difference between the maximum reflectance and the minimum reflectance are calculated, which are then substituted in the following Mathematical Formula 1, thus quantitatively confirming the change rate of the rainbow.

Specifically, the reflectance of a polarizing plate is measured under conditions of a 5° reflection mode, a 2 nm slit width, and an analysis wavelength range of 380 to 780 nm, using a UV-VIS spectrometer (model name: UV2550) manufactured by Shimadzu Corp., and reflectance data at 450 to 650 nm are derived, and then mean reflectance and a difference between the maximum reflectance and the minimum reflectance at 450 to 650 nm are calculated and substituted in the following Mathematical Formula, thus calculating the change rate of rainbow (ARb). Herein, the rainbow change rate may be 10% or less, or 1 to 10%.

$$\Delta Rb = (\text{maximum reflectance at } 450\text{–}650 \text{ nm} - \text{minimum reflectance at } 450 \text{ to } 650 \text{ nm}) \div (\text{mean reflectance at } 450 \text{ to } 650 \text{ nm}) \times 100 \quad \text{[Mathematical Formula 1]}$$

According to another embodiment of the present invention, an image display device including the polarizing plate is provided. Specifically, the image display device may include a display panel, and the polarizing plate positioned on at least one side of the display panel.

The display panel may be a liquid crystal panel, a plasma panel, or an organic light emitting panel, and thus the image display device may be a liquid crystal display device (LCD), a plasma display device (PDP), or an organic light emitting display device (OLED).

More specifically, the image display device may be a liquid crystal display device including a liquid crystal panel and optical laminates positioned on respective sides of the liquid crystal panel, wherein at least one of the polarizing plates may be the polarizing plate including a polarizer according to the above-explained embodiment of the present invention. Herein, the kind of the liquid crystal panel included in the liquid crystal display device is not specifically limited, but for example, known panels such as passive matrix panels such as TN (twisted nematic), STN (super twisted nematic), F (ferroelectric), and PD (polymer dispersed) types, active matrix panels such as F (ferroelectric) and PD (polymer dispersed) types, IPS (in plane switching) panels and VA (vertical alignment) panels, and the like may be applied.

Advantageous Effects

According to the present invention, a polarizing plate that includes a polyester-based substrate film, but does not exhibit the rainbow phenomenon, and has excellent visibility and mechanical properties and thus can be preferably applied for a window or a front panel of an image display device, and an image display device including the same, are provided.

DETAILED DESCRIPTION OF THE EMBODIMENTS

The present invention will be explained in more detail in the following examples. However, these examples are presented only as illustrations of the present invention, and the scope of the present invention is not limited thereby.

Synthesis Example 1: Synthesis of Polymodified Urethane Acrylate

As a multivalent isocyanate-based compound having three or more functional groups, an HDI-based trimer DN980S manufactured by Aekyung Chemical Co., Ltd. was used, and as a polyethylene glycol modified (meth) acrylate-based compound, polyethylene glycol monoacrylate (Mn=300) and polyethylene glycol monoacrylate (Mn=500) having different numbers of polyethylene glycol repeat units, thus having different number average molecular weights, were respectively used.

40 g of the multivalent isocyanate-based compound, 30 g of the polyethylene glycol monoacrylate (Mn=300), and 30 g of the polyethylene glycol monoacrylate (Mn=500) were mixed with 0.1 g of DBTDL (dibutyl tin dilaurate) and 200 g of methyl ethyl ketone, and the mixture was stirred at 60° C. for 5 hours to progress a urethane reaction. By the completion of the urethane reaction, a polyethylene glycol modified multifunctional urethane (meth) acrylate-based binder was prepared.

Whether or not the urethane reaction was progressed and the binder was produced were confirmed through FT-IR. The progression of the urethane reaction and the production of the binder were confirmed through disappearance of the peaks derived from isocyanate groups (—NCO) appearing at the position of about 2268.5 cm-1 during FT-IR analysis, from before to after the urethane reaction.

Synthesis Example 2: Synthesis of High Molecular Weight Copolymer

A high molecular weight copolymer (a PMMA-PBA block copolymer) was prepared by reversible addition fragment chain transfer polymerization (RAFT polymerization) of polymethylmethacrylate (PMMA) and poly (butyl acrylate) (PBA). Herein, the volume ratio of PMMA and PBA was about 1:1, and the number average molecular weight was about 30,000 g/mol. Further, the average particle diameter of the micelle structure formed by self-assembly of the PMMA-PBA block copolymer was about 15 nm.

Preparation Example 1: Preparation of a Coating Solution (A) for Forming a First Hard Coating Layer 38.74 g of trimethylol propane triacrylate (TMPTA), 30.99 g of the polymodified urethane acrylate prepared in Synthesis Example 1, 7.75 g of the high molecular weight copolymer prepared in Synthesis Example 2, 2.31 g of TPO (an initiator for photocuring, manufactured by Ciba Company), 0.21 g of T270 (a leveling agent manufactured by Tego Inc.), and solvents of 13.33 g of ethyl methyl ketone (MEK) and 6.67 g of methyl isobutyl ketone, were mixed to prepare a coating solution (A) for forming a first hard coating layer.

Preparation Example 2: Preparation of a Coating Solution (B-1) for Forming a Second Hard Coating Layer 12.48 g of pentaerythritol triacrylate (PETA), 49.90 g of C165 (a product including solid silica nanoparticles having an average diameter of 12 nm and pentaerythritol triacrylate at a weight ratio of 1:1, manufactured by NanoResin Company), 4.80 g of the high molecular weight copolymer prepared in Synthesis Example 2, 2.69 g of TPO (an initiator for photocuring, manufactured by Ciba Company), 0.13 g of T270 (a leveling agent manufactured by Tego Inc.), and solvents of 20 g of ethyl methyl ketone (MEK) and 10 g of methyl isobutyl ketone (MIBK), were mixed to prepare a coating solution (B-1) for forming a second hard coating layer.

Preparation Example 3: Preparation of a Coating Solution (B-2) for Forming a Second Hard Coating Layer 4.12 g of dipentaerythritol hexaacrylate (DPHA), 51.49 g of C165 (a product including hollow nanoparticles having an average size of 12 nm and pentaerythritol hexaacrylate at a weigh ratio of 1:1, manufactured by NanoResin Company), 6.18 g of the high molecular weight copolymer prepared in Synthesis Example 2, 3.09 g of TPO (an initiator for photocuring, manufactured by Ciba Company), 0.12 g of T270 (a leveling agent manufactured by Tego Inc.), and solvents of 23.33 g of ethyl methyl ketone (MEK) and 11.67 g of methyl isobutyl ketone (MIBK) were mixed to prepare a coating solution (B-2) for forming a second hard coating layer.

Preparation Example 4: Preparation of a Coating Solution (C) for Forming a Low Reflective Layer 100 g of trimethylol propane triacrylate (TMPTA), 283 g of hollow silica nanoparticles (diameter range: about 42 nm to 66 nm, manufactured by JSC catalyst and chemicals), 59 g of solid silica nanoparticles (diameter range: about 12 nm to 19 nm), 115 g of a first fluorine-containing compound (X-71-1203M, ShinEtsu), 15.5 g of a second fluorine-containing compound (RS-537, DIC), and 10 g of an initiator (Irgacure 127, Ciba Company) were diluted in a solvent of MIBK (methyl isobutyl ketone) to a solid concentration of 3 wt %, thus preparing a coating solution (C) for forming a low reflective layer.

Preparation Example 5: Preparation of a Coating Solution (D) for Forming an Anti-Fouling Layer 28 g of pentaerythritol triacrylate (PETA) as a multifunctional acrylate, 4.5 g of the reaction product of toluene diisocyanate and pentaerythritol triacrylate (UA-306T, manufactured by Kyoeisha) as a urethane acrylate, 10 g of a dispersion in which solid silica nanoparticles having an average particle diameter of 12 nm were dispersed in methyl isobutyl ketone (MEK-AC-2202, solid content 40%, solvent: methyl ethyl ketone (MEK), manufactured by Nissan Chemical), and 1.6 g of each of Irgacure 184 and Irgacure 127 as initiators were mixed with solvents of 35.2 g of methyl ethyl ketone and 17.6 g of isopropyl alcohol. Thereafter, 1.5 g of a fluorine-based compound of Optool DAC (solid content 20%, solvent: methyl ethyl ketone: methyl isobutyl ketone=3:1, manufactured by Shinetsu) were added to prepare a coating solution (D) for forming an anti-fouling layer.

Example 1

(1) Preparation of a Laminate Including a First Hard Coating Layer, a Substrate, and a Second Hard Coating Layer On a polyethylene terephthalate film having a thickness of 250 μm and retardation of 3000 nm, the coating solution (A) for forming a first hard coating layer prepared in Preparation Example 1 was coated with a #85 Mayer bar, and then dried at 80° C. for 2 minutes, and UV cured to form a first hard coating layer. As a UV lamp, a D bulb was used, and the curing reaction was progressed under a nitrogen atmosphere. During the curing, the amount of UV radiation was 1000 mJ/cm². As the result of measuring the thickness of the first hard coating layer with a thickness meter, the thickness of the coating was 71 μm.

On the other side of the polyethylene terephthalate film, a coating solution (B-1) for forming a second hard coating layer prepared in Preparation Example 2 was coated with a #60 Mayer bar, and then dried at 80° C. for 2 minutes, and UV cured to form a second hard coating layer. The UV curing of the second hard coating layer was conducted using a D bulb lamp, under a nitrogen atmosphere. During the curing, the amount of UV radiation was 180 mJ/cm². As the result of measuring the thickness of the second hard coating layer with a thickness meter, the thickness of the coating was 45 μm.

(2) Formation of a Low Reflective Layer

On the second hard coating layer, the coating solution (C) for forming a low reflective layer prepared in Preparation Example 4 was coated with a #10 Mayer bar to a thickness of about 100 nm, dried in a 90° C. oven for 1 minute, and cured to form a low reflective layer. During the curing, UV of 252 mJ/cu' was irradiated to the dried coating under nitrogen purging.

Thereafter, the longest diameters of each 100 to 170 hollow silica nanoparticles and solid silica nanoparticles contained in the low reflective layer were measured using a transmission electron microscope (TEM), which was repeated 10 times to calculate the average particle diameters of the hollow silica nanoparticles and solid silica nanoparticles. As a result, it was confirmed that the average diameter of the hollow silica nanoparticles was 54.9 nm, and the average diameter of the solid silica nanoparticles was 14.5 nm.

(3) Preparation of a Polarizing Plate

On one side of a polyvinyl alcohol polarizer, a quarter wave plate, was adhered by lamination using UV-curable adhesive. On the other side of the polyvinyl alcohol polarizer, the side of the first hard coating layer of the laminate was adhered with a UV-curable adhesive. Herein, the angle formed by the absorption axis of the polyvinyl alcohol polarizer and the slow axis of the polyethylene terephthalate film was controlled to 45°. Thereafter, an adhesive film was adhered to the side of the quarter wave plate to form an adhesive layer.

Example 2

(1) Preparation of a Laminate Including a First Hard Coating Layer, a Substrate, and a Second Hard Coating Layer A laminate was prepared by the same method as Example 1, except that the thickness of the first hard coating layer was 75 μm and the thickness of the second hard coating layer was 42 μm.

(2) Formation of an Anti-Fouling Layer

On the second hard coating layer, a coating solution (D) for forming an anti-fouling layer prepared in Preparation Example 5 was coated with a #10 Mayer bar to a thickness of about 3 μm, dried in a 90° C. oven for 2 minutes, and cured to form an anti-fouling layer. During the curing, UV of 252 mJ/cu' was irradiated to the dried coating under nitrogen purging.

(3) Preparation of a Polarizing Plate

A polarizing plate was prepared by the same method as Example 1, except that the angle formed by the absorption axis of the polyvinyl alcohol polarizer and the slow axis of the polyethylene terephthalate film was controlled to 50°.

Example 3

(1) Preparation of a Laminate Including a First Hard Coating Layer, a Substrate, and a Second Hard Coating Layer A laminate was prepared by the same method as Example 1, except that a coating solution (B-2) for forming a second hard coating layer was used to form a second hard coating layer, instead of the coating solution (B-1) for forming a second hard coating layer, and that the thickness of the first hard coating layer was controlled to 100 μm and the thickness of the second hard coating layer was controlled to 70 μm.

(2) Formation of an Anti-Fouling Layer

An anti-fouling layer was formed on the second hard coating layer by the same method for forming an anti-fouling layer of Example 2.

(3) Preparation of a Polarizing Plate

A polarizing plate was prepared by the same method as Example 1, except that the angle formed by the absorption axis of the polyvinyl alcohol polarizer and the slow axis of the polyethylene terephthalate film was controlled to 50°.

Example 4

(1) Preparation of a Laminate Including a First Hard Coating Layer, a Substrate, and a Second Hard Coating Layer A laminate was prepared by the same method as Example 1, except that the thickness of the polyethylene terephthalate film was 80 μm, the thickness of the first hard coating layer was 22 μm, and the thickness of the second hard coating layer was 21 μm.

(2) Formation of an Anti-Fouling Layer

An anti-fouling layer was formed on the second hard coating layer by the same method for forming an anti-fouling layer of Example 2, except that the thickness of the anti-fouling layer was 2.8 μm.

(3) Preparation of a Polarizing Plate

A polarizing plate was prepared by the same method as Example 1.

Comparative Example 1

(1) Preparation of a Laminate Including a First Hard Coating Layer, a Substrate, and a Second Hard Coating Layer A laminate was prepared by the same method as Example 1, except that a triacetylcellulose film having a thickness of 80 μm was used instead of the polyethylene terephthalate film, and that the thickness of the first hard coating layer was 24 μm and the thickness of the second hard coating layer was 21 μm.

(2) Formation of an Anti-Fouling Layer

An anti-fouling layer was formed on the second hard coating layer by the same method for forming an anti-fouling layer of Example 2.

(3) Preparation of a Polarizing Plate

Although a polarizing plate was prepared by the same method as Example 1, since the triacetyl cellulose film is a non-oriented film, and thus the slow axis and the fast axis are not clearly distinguished, it was adhered irrespective of the direction.

Comparative Example 2

(1) Preparation of a Laminate Including a First Hard Coating Layer, a Substrate, and a Second Hard Coating Layer A laminate was prepared by the same method as Example 1, except that the thickness of the first hard coating layer was 73 μm and the thickness of the second hard coating layer was 42 μm.

(2) Formation of an Anti-Fouling Layer

An anti-fouling layer was formed on the second hard coating layer by the same method for forming an anti-fouling layer of Example 2, except that the thickness of the anti-fouling layer was 2.7 μm.

(3) Preparation of a Polarizing Plate

A polarizing plate was prepared by the same method as Example 1, except that the angle formed by the absorption axis of the polyvinyl alcohol polarizer and the slow axis of the polyethylene terephthalate film was controlled to 0°.

Comparative Example 3

(1) Preparation of a Laminate Including a First Hard Coating Layer, a Substrate, and a Second Hard Coating Layer A laminate was prepared by the same method as Example 1, except that a first hard coating layer was not formed.

(2) Formation of an Anti-Fouling Layer

An anti-fouling layer was formed on the second hard coating layer by the same method for forming an anti-fouling layer of Example 2, except that the thickness of the anti-fouling layer was 2.8 μm.

(3) Preparation of a Polarizing Plate

A polarizing plate was prepared by the same method as Example 1, except that the polyethylene terephthalate film of the laminate was adhered with a UV-curable adhesive on the other side of the polyvinyl alcohol polarizer, on which a quarter wave plate was not adhered.

[Evaluation]

1. Measurement of Pencil Hardness

The polarizing plates prepared in the examples and comparative examples were scratched at an angle of 45° under a load of 500 g using a pencil hardness measuring device, according to measurement standard JIS K5400, and then observed with the naked eye to evaluate the maximum hardness without scratch, and the results are shown in the following Table 1.

Further, the structures without a polarizer in the polarizing plates of the examples and comparative examples, that is, the (1) laminate including a first hard coating layer, a light transmitting substrate, and a second hard coating layer, and (2) a hard coating film including an anti-fouling layer (or a low reflective layer), were scratched at an angle of 45° under a load of 1 kg using a pencil hardness measuring device according to measurement standard JIS K5400, and then observed with the naked eye to evaluate the maximum hardness without scratch, and the results are shown in the following Table 1.

2. Whether or not Rainbow Phenomenon is Generated

On the side of the adhesive layer of each film prepared in the examples and comparative examples, black tape (Vinyl tape 472 Black, manufactured by 3M Company) was attached, and then the side including an anti-fouling layer or a reflective layer was illuminated by a three-wavelength lamp to confirm with the unaided eye whether or not rainbow was generated, and the results are shown in the following Table 1. The evaluation with the naked eye was conducted under a three-wavelength lamp.

<Measurement Standard>

X: Rainbow stain does not exist.

o: Rainbow stain exists.

3. Measurement of Rainbow Change Rate

In order to quantitatively compare the degrees of rainbow, the reflectance of each polarizing plate of the examples and comparative examples was measured by the following method, and the rainbow change rate was calculated.

Each polarizing plate of the examples and comparative examples was cut into a size of 4 cm×4 cm, black tape (Vinyl tape 472 Black, manufactured by 3M company) was attached on the second hard coating layer, and then reflectance was measured in a 5° reflection mode, 2 nm slit width, and analysis wavelength range of 380 to 780 nm, using a UV-VIS spectrometer (model name: UV2550, manufactured by Shimadzu), and reflectance data at 450 to 650 nm were derived. From the derived reflectance data at 450 to 650 nm, mean reflectance and a difference between the maximum reflectance and the minimum reflectance were calculated, which were substituted in the following formula to calculate the change rate of rainbow (ΔRb), and the results are shown in the following Table 1.

$\Delta Rb$=(maximum reflectance at 450 to 650 nm−minimum reflectance at 450 to 650 nm)÷(mean reflectance at 450 to 650 nm)×100

4. Measurement of Curl

While the anti-fouling layer or low reflective layer of each polarizing plate of the examples and comparative examples, cut into a size of 10 cm×10 cm, was allowed to face upward, the middle part was pushed with a bar having a diameter of 1 cm or less such that it touched the bottom. Herein, after measuring the heights of four apexes lifting from the bottom side, the average height was calculated to obtain a curl value. The obtained curl value was indicated as a positive number. If the film was curled in a direction of the first hard coating layer, the polarizing plate was turned over so that the anti-fouling layer or reflective layer was positioned on the bottom, a curl value was obtained by the same method, and the curl value was indicated as a negative number.

TABLE 1

|  | Example 1 | Example 2 | Example 3 | Example 4 | Comparative Example 1 | Comparative Example 2 | Comparative Example 3 |
| --- | --- | --- | --- | --- | --- | --- | --- |
| Pencil hardness of a polarizing plate (500 gf) | 7H | 8H | 8H | 6H | H | 8H | 7H |

TABLE 1-continued

|  | Example 1 | Example 2 | Example 3 | Example 4 | Comparative Example 1 | Comparative Example 2 | Comparative Example 3 |
|---|---|---|---|---|---|---|---|
| Pencil hardness of a hard coating film (1 kgf) | 9H | 9H | 9H | 6H | 4H | 9H | 9H |
| Sunglass rainbow | X | X | X | X | X | O | X |
| Rainbow change rate | 2.5% | 2.4% | 2.4% | 3.1% | 2.4% | 11.5% | 3.3% |
| Curl value | +0.8 mm | −1.2 mm | −1.9 mm | +2.2 mm | +2.3 mm | +1.5 mm | +17 mm |

According to the Table 1, it was confirmed that Examples 1 to 4 have excellent pencil hardnesses, do not exhibit the rainbow phenomenon, and have low rainbow change rates and curl values, thus exhibiting excellent optical properties and mechanical properties.

Meanwhile, it was confirmed that Comparative Example 1 without a light transmitting substrate having in-plane birefringence had low pencil hardness and the resulting low mechanical properties, Comparative Example 2 wherein the angle formed by the slow axis of a light transmitting substrate and the absorption axis of a polarizer was 0° exhibited the rainbow phenomenon, and had a high rainbow change rate and the resulting low optical properties, and Comparative Example 3 without a first hard coating layer had a very high curl value.

What is claimed is:

1. A polarizing plate comprising:
   a polarizer;
   a first hard coating layer positioned on the polarizer, and containing a first binder resin comprising a (meth) acrylate-based (co) polymer;
   a light transmitting substrate positioned on the side of the first hard coating layer opposite to the polarizer, and having a retardation of at least 3000 nm and in-plane birefringence; and
   a second hard coating layer positioned on the side of the light transmitting substrate opposite to the first hard coating layer, and comprising a second binder resin and solid inorganic nanoparticles dispersed in the binder resin,
   wherein an acute angle formed by a slow axis of the light transmitting substrate and an absorption axis of the polarizer is 5 to 85°,
   wherein a thickness of the second hard coating layer is 45 µm or less,
   wherein a thickness ratio of the first hard coating layer and the second hard coating layer is 1:0.5 to 1:0.63, and
   wherein a rainbow change rate (ΔRb) of the polarizing plate calculated by Mathematical Formula 1 is 2.5% or less:

$\Delta Rb$=(maximum reflectance at 450 to 650 nm−minimum reflectance at 450 to 650 nm)÷(mean reflectance at 450 to 650 nm)×100, [Mathematical Formula 1]

wherein a reflectance of the polarizing plate is measured under conditions of a 5° reflection mode, 2 nm slit width, and an analysis wavelength range of 380 to 780 nm, using a UV-Vis spectrometer, from which reflectance data at 450 to 650 nm are derived, and then a mean reflectance and difference between a maximum reflectance and a minimum reflectance at 450 to 650 nm are calculated and substituted in the Mathematical Formula 1.

2. The polarizing plate according to claim 1, further comprising a quarter wave plate positioned on an opposite side of the polarizer to a side on which the first hard coating layer is positioned.

3. The polarizing plate according to claim 1, wherein the light transmitting substrate is a polyethylene terephthalate (PET) film.

4. The polarizing plate according to claim 1, wherein the light transmitting substrate has a difference in refractive indexes ($n_x$−$n_y$) of at least 0.05, wherein $n_x$ is a refractive index of a slow axis direction and $n_y$ is a refractive index of a fast axis direction that is orthogonal to the slow axis direction.

5. The polarizing plate according to claim 1, wherein the light transmitting substrate has a thickness of 10 to 500 µm.

6. The polarizing plate according to claim 1, wherein a thickness ratio of the light transmitting substrate and the second hard coating layer is 1:0.1 to 1:1.

7. The polarizing plate according to claim 1, wherein the (meth) acrylate-based (co) polymer of the first hard coating layer comprises monofunctional or multifunctional (meth) acrylate-based repeat units and urethane (meth) acrylate-based repeat units.

8. The polarizing plate according to claim 1, wherein the second binder resin of the second hard coating layer comprises a photocurable resin and a (co) polymer having a weight average molecular weight of at least 10,000 g/mol.

9. The polarizing plate according to claim 2, further comprising an adhesive layer positioned on an opposite side of the quarter wave plate to a side on which the polarizer is positioned.

10. The polarizing plate according to claim 1, further comprising a low reflective layer positioned on the second hard coating layer, and comprising a binder resin and inorganic nanoparticles dispersed in the binder resin, or
an anti-fouling layer positioned on the second hard coating layer, and comprising a binder resin, solid inorganic nanoparticles dispersed in the binder resin, and a fluorine-based compound.

11. The polarizing plate according to claim 1, wherein the polarizing plate has a pencil hardness under a 500 g load of 6H or more.

12. The polarizing plate according to claim 1, wherein a laminate comprising the first hard coating layer, the light transmitting substrate, and the second hard coating layer has a pencil hardness under a 1 kg load of 6H or more.

13. An image display device comprising the polarizing plate of claim 1.

\* \* \* \* \*